June 4, 1940.  M. L. RATHBUN  2,202,964
PRESS
Filed July 30, 1937

Fig. I

Inventor
Merrill L. Rathbun
By Richmond S. Hayes
His Attorney

Patented June 4, 1940

2,202,964

UNITED STATES PATENT OFFICE 2,202,964

PRESS

Merrill L. Rathbun, Salamanca, N. Y.

Application July 30, 1937, Serial No. 156,526

3 Claims. (Cl. 18—17)

This invention relates to an improvement in presses and particularly to presses having heated platens.

In one form the invention is applied to and forms part of a press adapted to be used in producing molded articles. Presses of this class include two relatively movable platens, between which is located a mold. The mold contains a substance which when properly heated will flow to completely fill the inner mold contour. To mold articles of this nature it is necessary that a uniform heat be supplied to the platens. In the present disclosure the platens are individually heated by small accurately controlled units, which are directly attached to and movable with said platens.

Prior to this invention it has been the practice in the use of presses for molding articles, to heat platens from a central steam boiler. Steam lines were run from the central boiler to the presses and at each press a flexible or swivel connection between the steam line and each platen was necessarily provided. The molding cycle for presses of this class is very short and, therefore, the platens of a press may be moved several hundred times in the course of the day. Due to the pressure in the steam line, as well as the constant flexing or swiveling, these connections would soon leak. A leak of this nature rapidly increased in size, and it was, therefore, impossible to maintain a given platen temperature. Furthermore, the molding cycle was disrupted and the molded articles imperfectly formed.

To some extent the above difficulties have been overcome by providing a smaller steam boiler for each press. In this instance only one boiler was in use when it was desired to mold in one press. This smaller boiler was located near the press and connected to the platens thereof through flexible or swivel lines. The proximity of the boiler to the press was of some benefit since the lines were relatively short and, therefore resulted in a reduction in heat loss. The fact that the connections between the boiler and the platens were either flexible or swivelable, however, affected the efficiency of the press for the same reasons mentioned above, since continual movement of the platens tended to produce leaks, the extent of which being both unaccountable and uncontrolled, prevented the operator from maintaining a given temperature in the platens necessary for molding purposes.

The present invention provides a small steam boiler adjacent each platen of a press. Inasmuch as each boiler is only required to provide steam to heat one platen, it may be extremely small, of very little weight, and be rigidly coupled with the platen. Furthermore, since there is only a small quantity of water in the boiler, it may be adequately heated at a very low cost through the use of suitable electric immersion units. The advantages of providing extremely small steam boilers having rigid connection with the platen of a press are, first, elimination of all possibility of leaks by the elimination of all swivel joints or flexible connections; second, making a self contained molding unit out of each press which may be operated independently of the operation of any other press or presses; and third, the immediate proximity of the boiler to the platen greatly reduces and practically eliminates heat losses.

Figure 1 is a perspective view taken generally from the rear of one modification of the invention;

Figure 2:
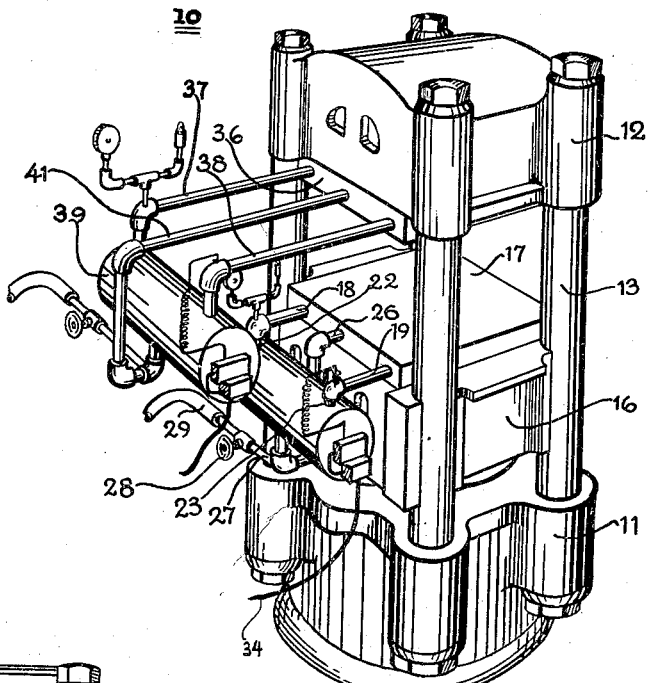
Figure 2 is a side elevational view of the structure shown in Figure 1.

Reference is now had to the drawing in which the numeral 10 is generally employed to designate a press of the type used in molding articles. The press is conventional in structure and comprises a base 11, top 12 and connecting supports or uprights 13. The base 11 is provided with a member 14 which is vertically movable toward or away from the top 12. Since the member 14 is vertically movable, guide members 16 are provided which move longitudinally of the supports 13, thus preventing misalignment of the member 14 as it is moved upwardly or downwardly. On top of member 14 is a platen 17. Pipes 18 and 19 project through one vertical wall of the platen to a compartment therein. Elbows 21 are joined to pipes 18 and 19 and further short sections of pipe 22 and 23 project into the top of a small boiler 24. A further pipe 26 located between pipes 18 and 19 projects into the compartment of the platen 17 and opens into the boiler 24 centrally of the bottom thereof. A water supply pipe 27 opens into the pipe 26, being controlled by a valve 28. Connection between the water pipe 27 and the source of water supply is had through a flexible line 29. It will be understood that provision of a flexible connection in the water line is not objectionable inasmuch as the water is under only ordinary pressure.

Figure 3:
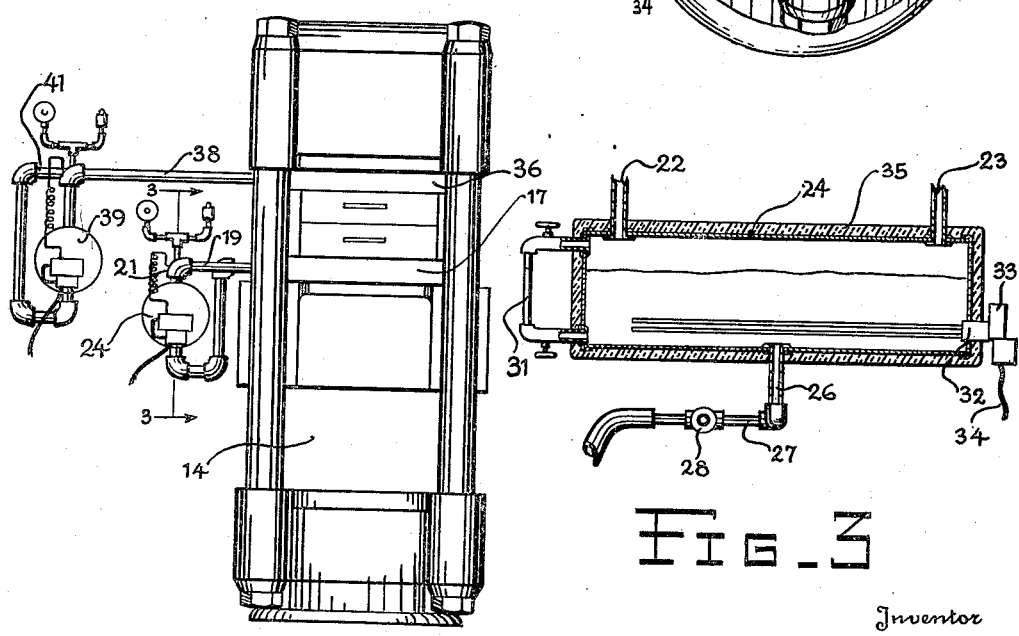
Figure 3 is an enlarged vertical sectional view through one of the boilers, being taken substantially on the line 3—3 of Figure 2.

The boiler 24 (see Figure 3) is provided at one end with a water gauge 31. In the opposite end an immersion electrical heating unit 32 is mounted, this unit projecting well into the boiler and being preferably adjacent the bottom wall thereof. A suitable pressure control relay 33 is provided for the unit 32 for the purpose of maintaining the water at a given temperature. The immersion unit and control relay separately, form no part of the invention inasmuch as they are commercially available. A flexible cable 34 connects the control relay 33 with a suitable source of current supply. The boiler 24 is enclosed by suitable insulating material 35. If conditions so require, the pipes connecting the boiler with the platen may also be insulated.

It is to be observed that pipes 22 and 23 constitute the steam outlet from the boiler 24 to the platen 17 and that pipe 26 constitutes the return or inlet to the boiler. Furthermore, because of the small size and light weight of the boiler, the inlet and outlet pipes 18, 19, and 26, which are secured to the platen 17, serve as the entire support of the boiler. Thus the boiler may move upwardly or downwardly with the platen 17. The flexible line 29 connected with a water supply and the flexible cable 34 are the only connections necessary for the operation of the boiler.

In the present disclosure an upper platen 36 is shown attached to the head 12. In some instances, however, it is necessary that the upper platen be movable toward or away from the lower platen. Therefore, it is desirable to provide a steam boiler closely and rigidly coupled to the upper platen. In the present disclosure pipes 37 and 38 connect a compartment in the platen 36 with the top of a boiler 39. A further pipe 41 connects the compartment of the platen 36 with the bottom of the boiler. A suitable water gauge (not shown), an immersion heating unit, and flexible connection with a source of water supply are provided for the boiler 39, this being identical with the structure of boiler 24. It is to be understood, however, (see Figure 2) that boiler 39 is rearwardly offset from boiler 24. Thus relative movement of platens 17 and 36 is possible without interference of the connections, valves, gauges, etc. of either boiler.

When it is desired to operate a press embodying the present invention, a suitable amount of water is let into the boilers 24 and 39. The electric heating units 32 are turned on and the relay set to produce a given pressure in the boilers for the purpose of creating a constant temperature in the platens. A mold is set on platen 17, and member 14 is actuated to move the mold upwardly into pressure contact with fixed platen 36. As platen 17 moves upwardly, boiler 24 secured thereto also moves upwardly. The heat of the platens is sufficient to cause the material in the mold to flow and fill the mold contour. Due to the fact that the boiler 24 and its connections with the platen are offset with respect to boiler 39 and the corresponding connections, boiler 24 may move upwardly the full distance of which platen 17 is capable of moving. Because of the diminutive size of boilers 24 and 39 the platens 17 and 36 are not placed under any weight strain whatsoever.

It is to be understood that the present invention creates of an ordinary press a self contained molding device which is operable independently of any other molding device. Furthermore, since heat is a prime consideration in the molding of articles of the class to which this invention relates, it will be noted that a given temperature in the platens may be more accurately maintained at a relatively low cost inasmuch as substantially all undesirable heat dissipation has been eliminated.

Although applicant has shown and described only one modification of the invention, it will be understood by those skilled in the art that other modifications or adaptations of the structure herein shown and described may be made without departing from the spirit and scope of the invention as set forth in the hereunto annexed claims.

Having thus set forth my invention what I claim as new and for which I desire protection by Letters Patent is:

1. In a press for molding articles, a pair of platens, means for relatively moving said platens toward or away from one another, said platens each being formed with a closed fluid containing compartment, water boilers for said platens, one being located adjacent each of said platens, electrical immersion units for generating steam in said boilers, means for transmitting steam from each of said boilers to the compartment of the adjacent platen, said means also serving to rigidly secure said boilers to their respective platens, each boiler being constrained to move in the same direction and to the same extent as the platen to which it is secured.

2. In a press for molding articles, a pair of relatively movable platens, said platens each being formed with a closed compartment, fluid heating units for said platens, one of said units being provided for and being located adjacent one end of each of said platens, fluid conveying means connecting said units with the compartments of said platens, said means also serving to rigidly secure each of said units to its respective platen, one of said units being laterally offset with respect to the other of said units to provide vertical clearance for relative movement toward or away from one another.

3. In a unitary and self contained device for use in producing articles in a mold through the application of heat and pressure, a supporting structure, a pair of relatively movable platens, said platens each being formed with a closed fluid containing compartment, fluid heating units for said platens, one of said units being provided for and being located adjacent each of said platens, fluid conveying means connecting said units with the compartments of said platens, said means also serving to rigidly secure each of said units to its respective platens whereby said units are relatively movable in the same direction and to the same extent that said platens are relatively movable.

MERRILL L. RATHBUN.